(No Model.)
C. E. NEWMAN.
BRAKE FOR VEHICLES.
No. 502,576. Patented Aug. 1, 1893.
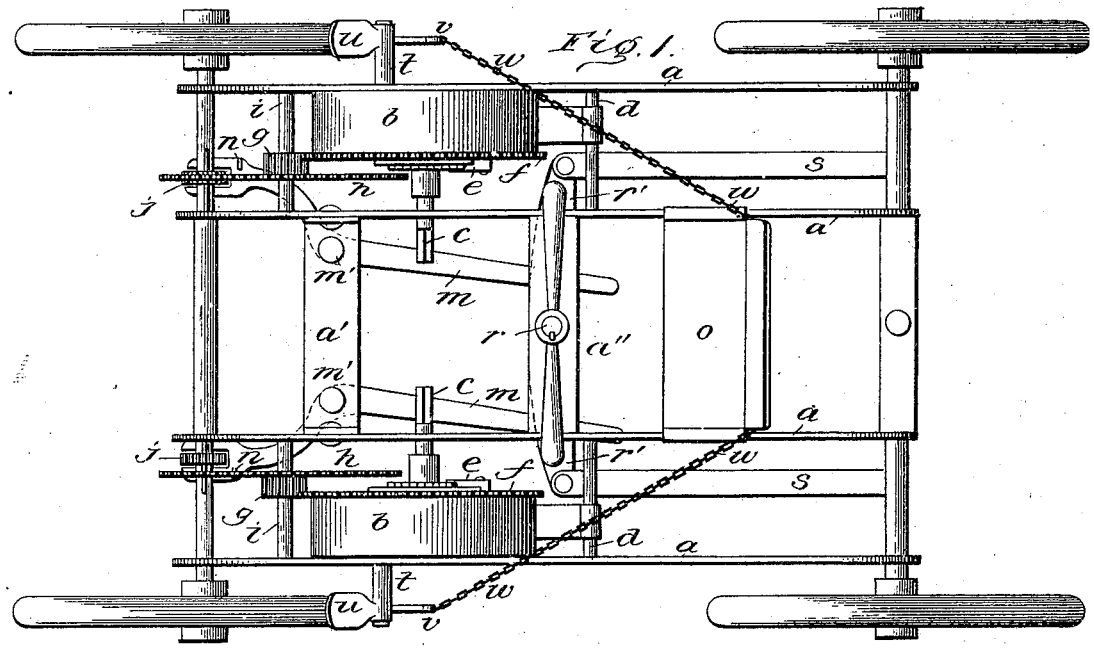
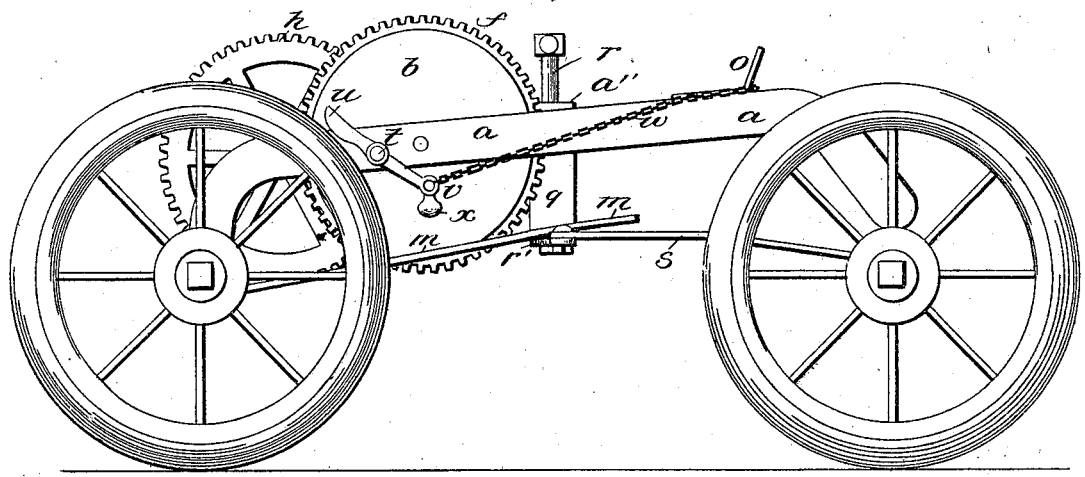
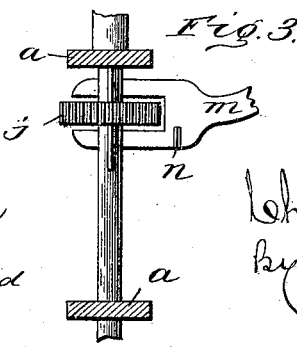
Witnesses
Guy H. Johnson
Edwin L. Bradford
Inventor
Charles E. Newman
By Johnson & Johnson
his Attorneys

UNITED STATES PATENT OFFICE.

CHARLES E. NEWMAN, OF BALTIMORE, MARYLAND.

BRAKE FOR VEHICLES.

SPECIFICATION forming part of Letters Patent No. 502,576, dated August 1, 1893.

Application filed April 21, 1893. Serial No. 471,332. (No model.)

*To all whom it may concern:*

Be it known that I, CHARLES E. NEWMAN, a citizen of the United States, and a resident of Baltimore city, in the State of Maryland, have invented certain new and useful Improvements in Brakes for Vehicles, of which the following is a specification.

My invention is directed to improvements in brakes for vehicles, and is particularly adapted for spring propelled velocipedes, and my said improvement consists of the combination with separate brake shoes, of a sliding seat for the rider and means for connecting said sliding seat and brake shoes, whereby the rider by pushing back his seat can apply the brakes and by drawing the seat forward can release the brakes, leaving his hands and feet free to direct the vehicle and to control the power.

Referring to the accompanying drawings, Figure 1 is a top view of a spring propelled velocipede having applied thereto my seat operated brake; and Fig. 2 is a side view of the same; and Fig. 3 is a detail view of the motor locking device.

$a$ is the frame which contains the spring power and the propelling mechanism.

$b$ are the drums which contain the spring motors, which drums are suitably fixed to the frames.

$c$ are the winding stems for the springs; and $d$ are studs by which the springs are fixed to the frames. Each winding stem has the usual ratchet pawl device $e$, and driving gear $f$. The power transmitting gear consists of a pinion $g$, and a gear $h$ on a stud $i$ mounted in each frame in front of the spring containing drum and a pinion $j$ fitted to slide upon the front axle and when engaged with the gear, drives said front axle and propels the vehicle. The axle pinions are fitted to slide thereon by a feather, so that the pinions may drive the axle when engaged with the motor train and be shifted to disengage the motor train. This allows both or either of the motors to be used, so that while one is in use the other will be wound up. The provisions which I have shown for effecting this shifting action consists of a foot-lever $m$ pivoted at $m'$ to the front axle plate $a'$ and forked at its front end to embrace the pinion beneath the axle. A tooth or stud $n$ stands up from this end of the lever in such position that when the pinion is shifted out of engagement with the motor gear, the tooth will be at one side of and out of engagement with said motor gear. When the said pinion is shifted out of engagement with said motor gear this tooth or stud will be moved between the teeth of said gear and lock it and hold it while the spring is being wound up, or when it is not desired to propel the vehicle. For this purpose the free ends of the levers extend back to near the rider's seat $o$, so that by his feet he can shift the levers sidewise, as he may desire to engage or disengage one or both of the axle pinions with the spring motors. The rider's seat $o$ is mounted upon the inner parallel bars of the side frames in such manner as to have a back and forth sliding movement thereon in the rear of the center angle-plate $a''$. A bracket or hanger $q$ depends centrally from this angle plate and with the latter supports a steering post $r$, to the lower end of which is rigidly secured a cross bar $r'$ upon which rests the handle of the pinion shifting levers. The ends of this steering post cross bar connect by rods $s\ s$ with the rear steering axle by which the rider directs the machine. The cross bar of the steering post while forming a rest for the handles of the gear shifting levers also forms a foot-rest for the rider so that he can steer the machine by his feet pushing upon either arm of this cross bar or by his hands controlling the handles $r''$ of the steering post.

I utilize the sliding function of the seat as a means of applying and releasing the brakes for the vehicle, and for this purpose I use a lever-brake mounted on a stud $t$ projecting from the side frame, so that the shoe ends $u$ will stand over the front wheels and the lever ends $v$ will be connected together by a chain or cord $w$ which is loosely connected to the sliding seat, so that its movement will apply or release the brakes. A simple way of making such connection is by passing the brake cord around the back of the seat, as shown, but its connection with the latter must be such as to allow the pulling action on the cord by the seat to be equal upon both brake levers to give equal pressure of both brake shoes upon the wheels. In doing this the rider pushes his body against the back of the seat and forcing the latter back on its frame ways applies the brakes with a force regulated by the pressure with which he presses against the seat. To release the brakes the seat is moved forward and the lever end of the brake shoe being weighted at $x$, as shown in Fig. 2, the shoe will be held out of contact with the wheel. In applying the brakes the rider exerts a pressure to force the seat back, by pushing with his feet upon the cross bar of the steering post, and thus both steers the machine and applies the brakes by his feet at the same time; while at the same moment he can use his feet to engage or disengage one or both of the motor controlling levers. In these particulars my improvements give the rider perfect control of the machine by his feet, to propel it, to stop, and to direct it. In self propelled vehicles it is important to both direct and to stop it at any point, and to release and engage the spring power, and these things I effect by the co-operation of the sliding seat, the brakes, the steering device, and the shifting levers, all of which for these purposes being under the direct control of the rider.

The way in which I use the foot-rest steering bar and motor shifting levers, makes it convenient to support the latter on the foot rest so that the rider may use his feet for either purpose.

I claim as my improvement—

1. In a vehicle, the combination, with separate brake shoes, of a sliding seat for the rider, and means for connecting said sliding seat and brake shoes, substantially as described.

2. In a vehicle, the combination, with separate brake shoes, of a sliding seat and a chain or cord connecting the seat and brakes substantially as described.

3. In a brake for vehicles, the combination, with the brake shoes having weighted lever ends, of a sliding seat and a chain or rope connected to the weighted ends of said shoes and passing free around the back of the seat, substantially as described.

In testimony whereof I have hereunto signed this specification in the presence of witnesses.

CHAS. E. NEWMAN.

Witnesses:
CARL R. RUDERT,
JOHN B. JOHNSTON.